United States Patent [19]
Gorce

[11] Patent Number: 6,059,294
[45] Date of Patent: *May 9, 2000

[54] WINDSCREEN WIPER MECHANISM HAVING IMPROVED GUIDING AND SEALING MEANS FOR THE PASSAGE OF A DRIVING SHAFT THROUGH A PANEL

[75] Inventor: Stéphane Gorce, Chatellerault, France

[73] Assignee: Valeo Systems d'Essuyage, La Verriere, France

[ * ] Notice: This patent issued on a continued prosecution application filed under 37 CFR 1.53(d), and is subject to the twenty year patent term provisions of 35 U.S.C. 154(a)(2).

[21] Appl. No.: 08/777,359

[22] Filed: Dec. 27, 1996

[30] Foreign Application Priority Data

Dec. 27, 1995 [FR] France .................. 95.15522

[51] Int. Cl.⁷ .......................................... F16J 15/10
[52] U.S. Cl. .................. 277/630; 277/634; 277/637; 277/644; 15/250.34
[58] Field of Search ............ 174/153 R; 15/250.34, 15/250.3; 411/531; 277/604, 606, 607, 619, 620, 626, 630, 634, 637, 644; 16/2.1, 2.2

[56] References Cited

U.S. PATENT DOCUMENTS

| | | | |
|---|---|---|---|
| 1,814,502 | 7/1931 | Barwood | 411/531 |
| 2,690,470 | 9/1954 | Moorhead | 277/178 |
| 2,731,065 | 1/1956 | Powers | 411/531 |
| 2,787,486 | 4/1957 | Thiry | 16/2.1 |
| 2,806,080 | 9/1957 | Corey | 16/2.2 |
| 2,953,154 | 9/1960 | Agoliati et al. | 277/178 |
| 3,099,057 | 7/1963 | Cook | 16/2.1 |
| 3,537,711 | 11/1970 | Walker | 277/12 |
| 3,541,918 | 11/1970 | Johnson | 411/531 |
| 3,790,985 | 2/1974 | Kessler | 15/250.34 |
| 3,895,408 | 7/1975 | Leingang | 16/2.1 |
| 4,088,241 | 5/1978 | Hall et al. | 277/212 F |
| 4,630,834 | 12/1986 | Muller et al. | 277/212 F |
| 5,460,454 | 10/1995 | Renoux | 384/152 |

FOREIGN PATENT DOCUMENTS

| | | |
|---|---|---|
| 0 635 651 | 1/1995 | European Pat. Off. . |
| 2 142 099 | 1/1973 | France . |
| 2 216 792 | 8/1974 | France . |
| 0292969 | 12/1987 | Japan .............. 277/212 F |

Primary Examiner—Anthony Knight
Assistant Examiner—John L. Beres
Attorney, Agent, or Firm—Morgan & Finnegan, LLP

[57] ABSTRACT

The invention relates to a windscreen wiper mechanism cf the kind having a shaft for driving a windscreen wiper arm which passes through an aperture in the vehicle body with the interposition of a guiding and sealing device, and an outer and inner annular sealing joint. According to the invention, the outer annular sealing joint is produced in one piece with the inner annular sealing joint, and said one-piece sealing joint is adapted to be inserted axially through the aperture prior to the axial clamping of the assembly by means of the clamping nut.

11 Claims, 2 Drawing Sheets

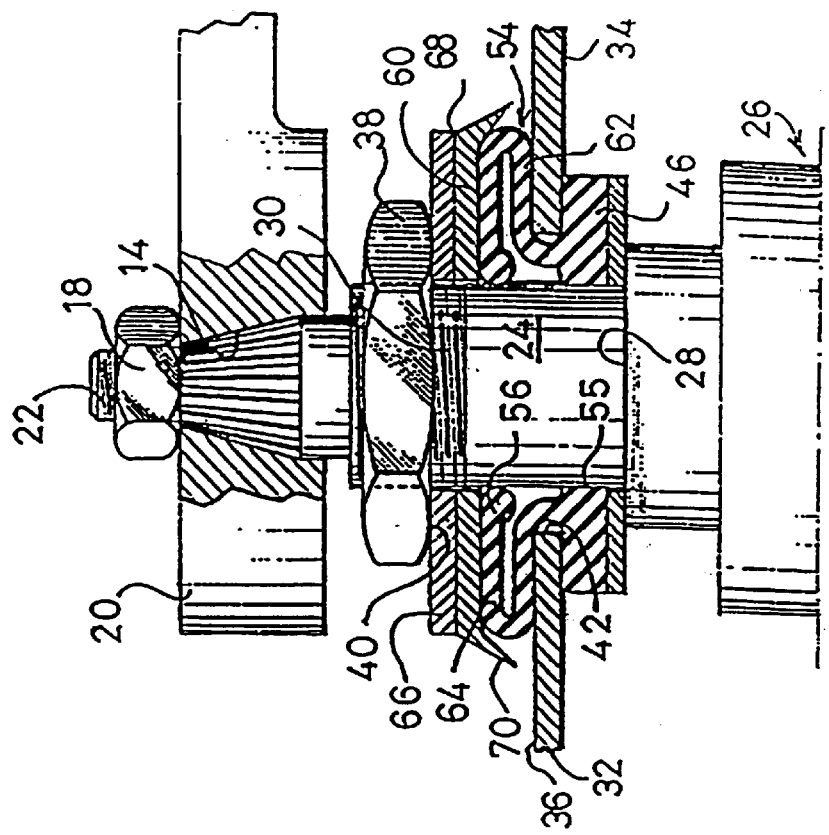
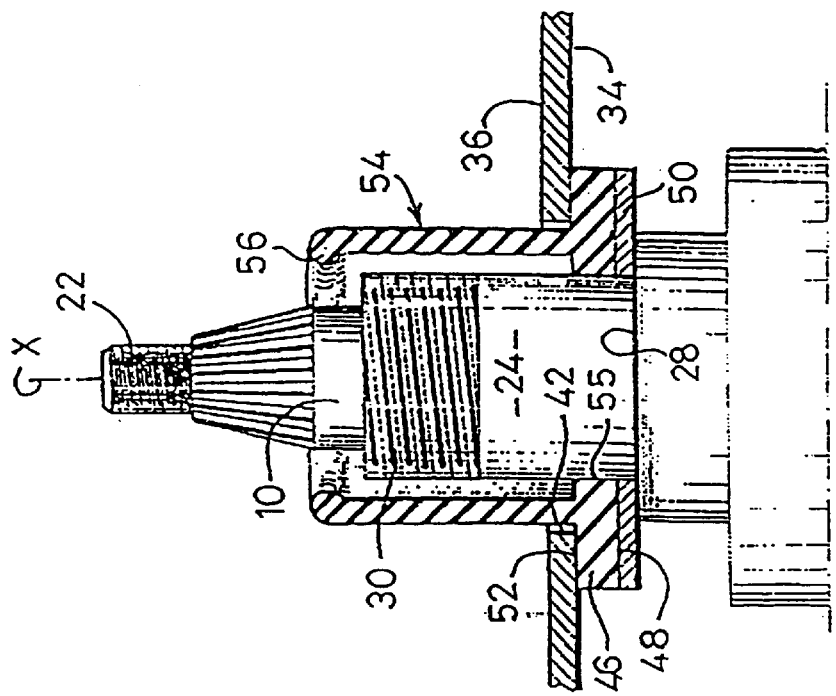

WINDSCREEN WIPER MECHANISM HAVING IMPROVED GUIDING AND SEALING MEANS FOR THE PASSAGE OF A DRIVING SHAFT THROUGH A PANEL

FIELD OF THE INVENTION

The present invention concerns a windscreen wiper mechanism for a vehicle.

The invention concerns more particularly a windscreen wiper mechanism having a shaft for driving a windscreen wiper arm in rotation, which passes through an aperture formed in a panel of the motor vehicle, with the interposition of a guiding and sealing device.

BACKGROUND OF THE INVENTION

According to a known design, the guiding and sealing device comprises a barrel for guiding in rotation the windscreen wiper shaft which extends through the aperture in the vehicle body, having a radial collar extending opposite the inner face of the panel, with the interposition of an inner annular sealing joint, and a free end which protrudes axially beyond the outer face of the panel having a thread on which is screwed a clamping nut whose radial clamping face cooperates with the outer face of the panel with the interposition of an outer annular sealing joint This design makes it possible to provide guidance in rotation of the driving spindle within the barrel, at the level where the shaft passes through the vehicle body, whilst providing good sealing of the aperture formed in the panel, thus preventing any unwanted penetration of water into the vehicle.

However, this design of the prior art requires two sealing joints, and this increases the number of components and complicates their assembly, the correct positioning of the sealing joints being notably a criterion determining the sealing quality obtained.

In addition, it is desirable to insulate the windscreen wiper mechanisms elastically to the maximum extent with respect to the structure of the vehicle body by interposing damping devices at the level of the different means for fixing and mounting the mechanism on the vehicle.

DISCUSSION OF THE INVENTION

The aim of the present invention is to provide a windscreen wiper mechanism of the kind mentioned above, in which the design of the sealing means is particularly simple and which also makes it possible to limit the transmission of vibrations.

With this object in mind, the invention proposes a windscreen wiper mechanism characterised in that the outer annular sealing joint is produced in one piece with the inner annular sealing joint; and in that the single one-piece sealing joint is adapted to be inserted axially through the aperture, prior to the axial clamping of the assembly by means of the clamping nut.

According to other characteristics of the invention:

the single sealing joint is inserted axially through the aperture from the inner face of the panel;

the single sealing joint has an inner annular shoulder interposed between the radial collar of the guiding barrel and the inner face of the panel and a cylindrical sleeve produced in one piece which extends from the upper annular face of the shoulder, through the aperture in the panel, and which, when the assembly is in the clamped position, is compressed axially by the nut in order to form an outer annular sealing joint arranged between the cylindrical body of the barrel and the aperture in the panel;

in the clamped position, the end section of the sleeve which extends axially beyond the outer face of the panel is deformed in a concertina shape and has a first fold which extends radially in contact with the outer face of the panel and a second fold which extends radially in contact with the radial clamping face of the nut and whose free end edge cooperates sealingly with the cylindrical body of the guiding barrel;

the free end edge of the sleeve has a sealing rim;

the internal diameter of the sleeve is greater than the greater diameter of the guiding barrel;

a clamping washer is interposed axially between the radial clamping face of the nut and the single sealing joint, and the outer radial edge of the washer is profiled in order to guide the sleeve during axial clamping;

the outer radial edge of the clamping washer is profiled in a tapered manner in the direction of the outer face of the panel and cooperates with the sealing rim of the sleeve;

a bearing washer is interposed between the radial collar ol the barrel and the opposite face of the shoulder of the sealing joint;

the axial thickness of the shoulder of the sealing joint gives it a vibration-damping function interposed between the guiding barrel and the panel.

Other characteristics and advantages of the invention will emerge more clearly from a reading of the description which follows by way of non-limitative example with reference to the accompanying drawings.

BRIEF DESCRIPTION OF THE DRAWINGS

FIG. 2 is a view in axial section which illustrates some of the components of FIG. 1 in the axially inserted position in the hole in the panel prior to axial clamping of the sealing means and prior to the mounting of the windscreen wiper arm; and FIG. 3 is a view similar to that of FIG. 2 which illustrates all the components of FIG. 1 with the sealing means in the clamped position and the windscreen wiper arm in the mounted position.

DESCRIPTION OF A PREFERRED EMBODIMENT OF THE INVENTION

Figure 1:
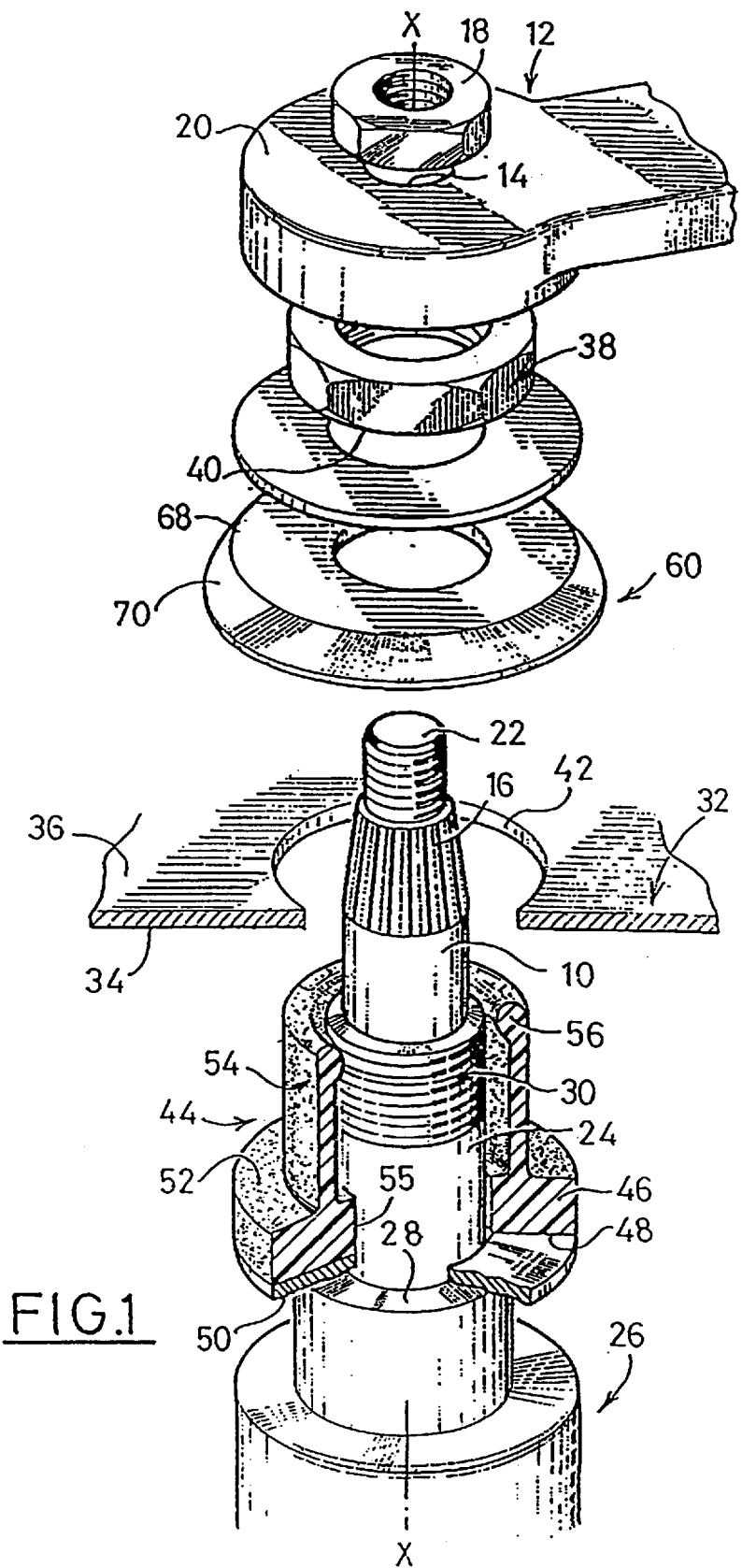
FIG. 1 is an exploded perspective view of the principal components of a windscreen wiper mechanism according to the disclosures of the invention, having improved guiding and sealing means.

These figures depict a windscreen wiper mechanism of generally orthodox design having a shaft 10 for driving a windscreen wiper arm 12 in rotation in an alternating sweeping motion, about a geometric axis X—X.

Also conventionally, the windscreen wiper arm 12 has a conical hole 14 which is designed to be mounted on the free conical, fluted end 16 of the shaft 10 on which the arm 12 is fixed by axial clamping by means of a clamping nut 18 on the head 20 of the arm which is screwed onto the free threaded end 22 of the driving shaft 10.

The shaft 10 is guided in rotation about the axis X—X in a guiding barrel 24 forming part of the body 26 of a guide bearing of the shaft 10 or forming the housing of a geared motor for driving the shaft 10.

The guiding barrel 24 is a part of tubular, cylindrical shape which is delimited axially by an annular radial collar 28 and whose free end, the larger in FIG. 1, has an external thread 30.

The housing 26 with the guiding barrel 24 is designed to enable the driving shaft 10 to be mounted and guided in rotation in a panel 32 forming, part of the bodywork or of a structural element of the body of a motor vehicle equipped with the windscreen wiper mechanism.

The panel 32 is delimited by an inner face 34 turned to face the collar 28 and by an outer face 36 which is turned axially towards the upper part above which an axial clamping nut 38 extends, in the mounted position of the guiding barrel 24 on the panel 32.

The clamping nut 38 is designed to be screwed onto the thread 30 of the guiding barrel 24 and has a lower radial clamping face 40 oriented in the direction of the outer face 36 of the panel 32.

In order to permit the passage of the guiding barrel 24, the panel 32 has an aperture in the form of a circular hole 42.

In order to provide a good seal at the point where the panel 32 is penetrated, and in accordance with the disclosures of the invention, a single one-piece sealing joint 44 is provided.

The sealing joint 44 has, in its lower part as seen in the figures, a solid annular shoulder 46 which is delimited by a lower annular face 48 which bears axially against the bearing collar 28 of the shaft 24 with the interposition of a bearing washer 50.

The upper annular face 52 of the shoulder 46 is designed to cooperate with the inner face 34 of the panel 32.

The single sealing joint 44 also has an upper part which, in i he non-clamped position illustrated in FIGS. 1 and 2, is in the form of a tubular cylindrical sleeve 54 produced from an elastomer in one piece with the shoulder 46 and which extends axially from the upper face 52.

The internal diameter of the sealing sleeve 54 is greater than the internal diameter of the central hole 55 of the shoulder which is itself substantially equal to the greater diameter of the guiding barrel 24.

The internal diameter of the sleeve 54 is thus greater than the guiding barrel 24 whilst its external diameter is slightly less than the diameter of the hole 42 for enabling the sleeve 54 to be inserted axially without effort into the hole 42 in order to occupy the mounting position illustrated in FIG. 2, in which the sleeve 54 extends axially above the outer face 36 of the panel 32 and opposite the barrel 24.

In the vicinity of its upper free end edge, the sleeve 54 has a sealing rim 56 which, in axial section, has a substantially circular section.

In order to facilitate the axial clamping of the sealing sleeve 54 and its forming into a concertina, as will be explained hereinafter, a clamping washer 60 is provided which is interposed axially between the lower radial face 40 of the nut 38 and the single sealing joint 44.

During axial clamping of the sealing means by the nut 38, and as can be seen in FIG. 3, the sealing sleeve 54 is folded axially into a concertina.

In the folded position, the sleeve 54 has a first fold 62 of radial orientation which sealingly hugs the upper outer face 36 of the panel 32 and which is extended by a second superimposed fold 64 which also extends radially and which bears against the lower face of the clamping washer 60.

In the clamped position, the rim 56 cooperates sealingly with the outer cylindrical surface of the guiding barrel 24.

In order to prevent the unwanted rotation of the sealing sleeve 54 during clamping, an additional washer 66 is interposed between the clamping nut 38 and the clamping washer 60.

In order to facilitate the guiding and folding into a concertina of the sleeve 54, the outer annular edge 68 of the clamping washer 60 is extended by an annular portion of tapered form in the form of a bevel 70 oriented in the direction of the outer face 36 of the panel 32.

As can be seen in FIG. 3, the single sealing joint 54 prosides a double seal at the hole 42 formed in the panel 32 and at the guiding barrel 24 by the rim 56 and by the slight radial clamping of the central hole 55 in the shoulder 46.

Owing to its great axial thickness, the shoulder 46 also forms a vibration-damping shoulder preventing any unwanted transmission of vibrations between the windscreen wiper mechanism and the panel 32.

It will be understood that the fitting of the sealing and vibration-damping means formed by the single sealing joint 54 is particularly easy as it is effected in the same axial insertion operation, from bottom to top as seen in FIGS. 1 and 2, of the housing 26 with the guiding barrel 24 and the driving shaft 10, in the hole 42.

The invention is not limited to this embodiment as it will easily be understood that it is possible, depending on the mounting and assembly requirements on different types of vehicle, to reverse the design of the single sealing element 54, that is to say to make provision for its shoulder to be situated above the outer face 36 whilst the sealing sleeve is inserted axially in the hole 42 in order to protrude axially beyond the inner face 34.

Likewise, the invention is not limited to the guiding and sealing of a driving shaft, but can find application in the mounting of a windscreen wiper mechanism on a motor vehicle wherever it is necessary to effect a positioning in a passage through a wall whilst providing good sealing and vibration damping.

What is claimed is:

1. In a vehicle having a panel, the panel having a first face, a second face, and an aperture formed therethrough, and a shaft passing through the aperture, the shaft having a guiding barrel, a guiding and sealing device for engaging the guiding barrel and sealing the aperture, the guiding and sealing device comprising:

a one-piece sealing joint having an annular shoulder and a sleeve portion extending therefrom and having a free end edge with a substantially circular sealing rim for engaging the guiding barrel, the sealing joint configured to be inserted on the guiding barrel so that the annular shoulder is on the first face of the panel and the sleeve portion through the aperture to the second face of the panel;

a clamping nut engageable with the guiding barrel f)r engagement into a clamped position; and a clamping washer interposed axially between the nut and the one-piece sealing joint, the clamping washer having a profiled outer radial edge, wherein engagement of the nut with the guiding barrel causes the clamping washer to deform the sleeve portion into a predetermined shape, having a first sealing joint on the second face of the panel formed by the deformed sleeve portion and a second sealing joint on the first face of the panel formed by the annular shoulder.

2. The device of claim 1, wherein the first side of the panel is an inner face of the panel and the one-piece sealing joint is adapted to be inserted axially through the aperture from the inner face of the panel.

3. The device of claim 2, wherein the annular shoulder of the one-piece sealing joint is operable to provide a vibration-damping function between the guiding barrel and the panel.

4. The device of claim 1, wherein, in the clamped position, the sleeve portion which extends axially beyond the second face of the panel is deformed in a concertina shape and has a first fold which extends radially in contact with the second face of the panel and a second fold which extends radially in contact with the nut the free end edge cooperating sealingly with the guiding barrel.

5. The device of claim 1, wherein the guiding barrel has an external diameter and the sleeve portion has an internal diameter that is greater than the diameter of the guiding barrel.

6. The device of claim 1, wherein the profiled outer radial edge of the clamping washer is profiled towards the second surface of the panel to guide the sleeve portion during axial clamping.

7. The device of claim 6, wherein the sleeve portion has a sealing rim and the outer radial edge of the clamping washer cooperates with the sealing rim of the sleeve portion.

8. The device of claim 1, further including a bearing washer interposed between the guiding barrel and the annular shoulder of the one-piece sealing joint.

9. In a vehicle having a panel, the panel having a first face, a second face, and an aperture formed therethrough, and a shaft passing through the aperture, the shaft having a guiding barrel, a guiding and sealing device for engaging the guiding barrel and sealing the aperture, the guiding and sealing device comprising:

first means for passing through and sealing the aperture of the panel, the first means including rim means for contacting and guiding the first means relative to the guiding barrel;

second means for engaging the guiding barrel for engagement into a clamped position; and third means for deforming the first means in a concertina shape to seal the aperture, the third means including a clamping washer having a profiled outer radial edge interposed axially between the second means and the first means.

10. The device of claim 9 wherein the third means comprises a clamping washer having a profiled outer radial edge, wherein engagement of the second means into the clamped position causes the profiled washer to deform the first means.

11. The device of claim 6 wherein the first means comprises a one-piece sealing joint having an annular shoulder and a sleeve portion extending therefrom and having a free end edge, the sealing joint configured to be inserted on the guiding barrel so that the annular shoulder is on the first face of the panel and the sleeve portion through the aperture to the second face of the panel, and wherein in the clamped position, the clamping washer causes the one-piece sealing joint to deform into a concertina shape, having a first sealing joint on the second face of the panel formed by the deformed sleeve portion and a second sealing joint on the first face of the panel formed by the annular shoulder.

* * * * *